(12) United States Patent
Sites

(10) Patent No.: US 6,799,302 B1
(45) Date of Patent: Sep. 28, 2004

(54) LOW-FIDELITY DOCUMENT RENDERING

(75) Inventor: Richard L. Sites, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 701 days.

(21) Appl. No.: 09/664,876

(22) Filed: Sep. 19, 2000

(51) Int. Cl.[7] .............................................. G06F 17/00
(52) U.S. Cl. ........................ 715/526; 705/51; 358/1.2
(58) Field of Search ............................. 705/51, 52, 54, 705/57; 380/201; 358/1.15, 1.2, 447, 451, 528; 382/112, 135; 715/526

(56) References Cited

U.S. PATENT DOCUMENTS

| | | | | |
|---|---|---|---|---|
| 4,851,825 A | * | 7/1989 | Naiman ...................... | 345/596 |
| 5,335,290 A | * | 8/1994 | Cullen et al. ............... | 382/176 |
| 6,314,409 B2 | * | 11/2001 | Schneck et al. ............. | 705/54 |
| 6,389,402 B1 | * | 5/2002 | Ginter et al. ................ | 705/51 |

* cited by examiner

Primary Examiner—Joseph Feild
Assistant Examiner—James H Blackwell
(74) Attorney, Agent, or Firm—Fish & Richardson P.C.

(57) ABSTRACT

Methods and apparatus, including computer program products, for printing an electronic document. In one aspect, a method includes receiving an electronic document and usage rights, the usage rights permitting uses of the document including a low-fidelity print use; rendering the document in response to a print request by creating a low-fidelity bitmap for each page of the document in accordance with the usage rights; and printing the low-fidelity bitmaps to an output device, whereby the print output is a low fidelity rendering of the document. Particular embodiments can include one or more of the following features. The document is rendered at a pre-determined resolution specified in the usage rights. The pre-determined resolution is lower than a minimum required by an optical character recognition (OCR) system. The document is rendered at a pre-determined color fidelity specified in the usage rights. The pre-determined color fidelity is a 2-bit grayscale. The print output is produced on a piece of paper, on film, or on a display screen.

12 Claims, 1 Drawing Sheet

LOW-FIDELITY DOCUMENT RENDERING

BACKGROUND OF THE INVENTION

The present invention relates to printing an electronic document subject to usage rights.

With the growing demand for online content, providers of distributed electronic content, such as publishers, distributors, and Web retailers, often desire to restrict access to the content to authorized users only. For example, a copyright holder may wish to restrict access to those individuals who have paid for a copy of an electronic book.

Some electronic content is distributed in a freely-readable form, that is, with no protection against unauthorized use or copying. Other content is distributed in encrypted or otherwise protected form. For example, encrypted documents require a decryption key or other mechanism for rendering the document readable to an authorized user. Some decryption mechanisms use the same encrypted document and same key for all users. Others produce a specifically-encrypted document and unique key for each user. Yet others use the same encrypted document for all users, but supply a separate decryption, or usage rights file, that is unique to each user and is in some way tied to the user or the user's computing environment.

Prior usage rights designs allow a document provider to set access permissions so that only two printing alternatives are permitted—i.e., "no printing" and "printing". If printing is allowed, the operation produces a high-fidelity original of the document. For example, an encrypted document printed to an Adobe® PostScript® printer can result in a PostScript file stored on disk. This PostScript file is a complete, high-fidelity, unencrypted (i.e., plaintext) version of the document and can be used to republish the encrypted original. This is undesirable from a copyright-protection standpoint, as the high-fidelity original can be mass distributed, and the source document can be recovered from the printout by OCR (optical character recognition) processing or from a page description language print file.

SUMMARY OF THE INVENTION

In general, in one aspect, the invention provides a method and an apparatus including a computer program product for printing an electronic document. The method includes receiving an electronic document and usage rights, the usage rights permitting uses of the document including a low-fidelity print use; rendering the document in response to a print request by creating a low-fidelity bitmap for each page of the document in accordance with the usage rights; and printing the low-fidelity bitmaps to an output device, whereby the print output is a low fidelity rendering of the document. Advantageous implementations can include one or more of the following features. The document is rendered at a pre-determined resolution specified in the usage rights. The document is rendered at a resolution lower than a minimum required by an optical character recognition (OCR) system. The document is rendered at a pre-determined color fidelity specified in the usage rights. The document is rendered at a color fidelity of 2-bit grayscale. The print output is produced on a piece of paper, on film, or on a display screen.

Advantages that can be seen in implementations of the invention include one or more of the following. The invention provides a document provider a middle-ground choice between all-or-nothing printing operations. The invention allows a user to print a low-fidelity rendering of the electronic document that does not represent a high-fidelity original of the document. This allows the user to have a hardcopy of the document, while protecting the document provider from mass distribution of a high-fidelity original of the document. Valuable features of electronic content, such as the ability to search text, bookmarks, hyperlinks, and scalable fonts are stripped out in the low-fidelity bitmaps.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
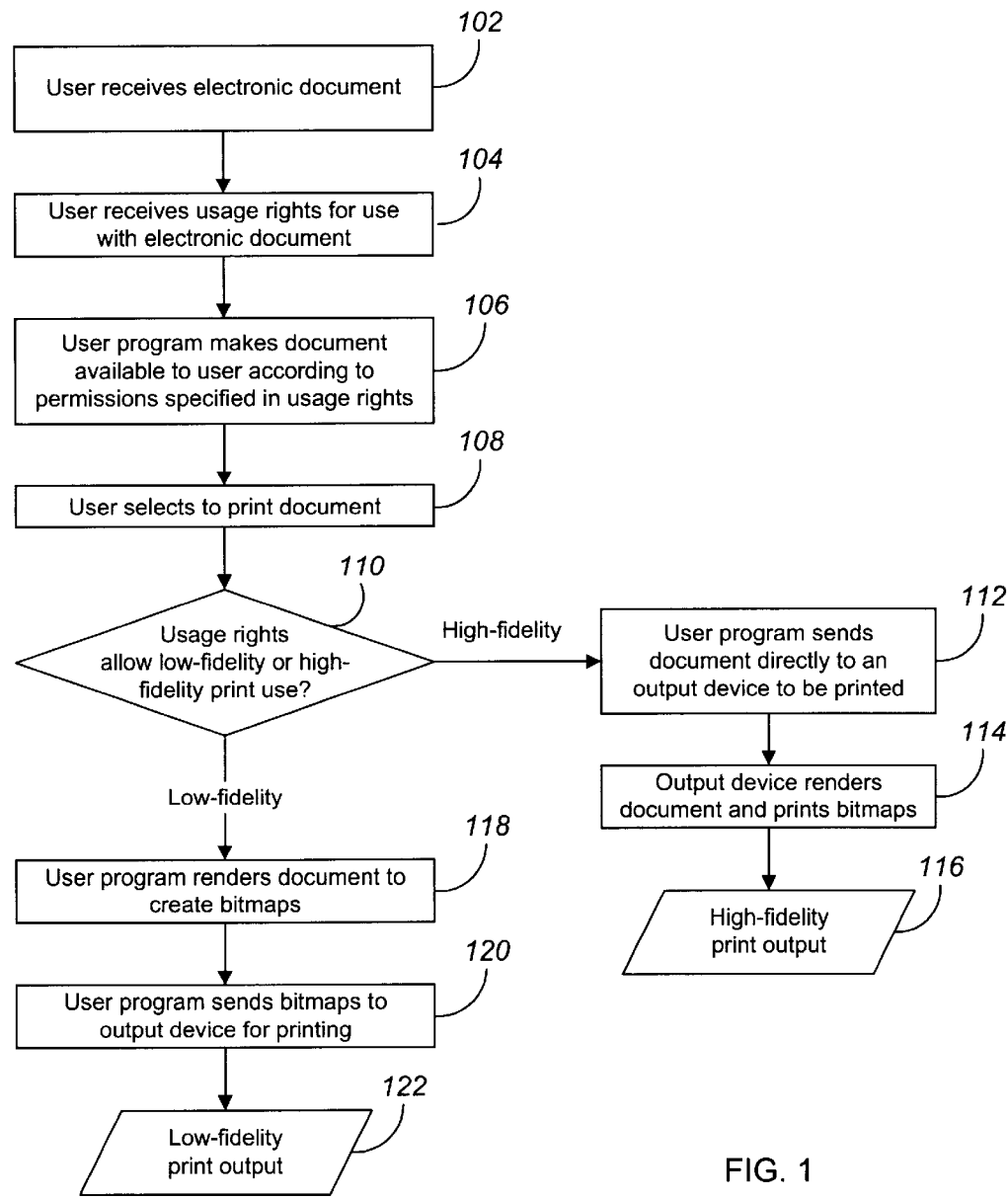
FIG. 1 is a flowchart of a document printing process in accordance with the invention.

As shown in FIG. 1, a user receives an electronic document (step 102) through some form of distribution. The user might have downloaded the document from a web site—the document provider's web site, for example—onto a personal computer or public kiosk as a result of a purchase. Alternatively, the user might have received the document through super-distribution, i.e., a free distribution of a document through e-mail, on CD-ROM or over the Web.

The electronic document can include pixel data that collectively represents one or more bitmap pages. Alternatively, the electronic document can be a page description language (PDL) file, such as an Adobe® PostScript® language file, an Adobe® portable document format (PDF) file, or a Hewlett-Packard® printer control language file. A PDL file describes the appearance of one or more bitmap pages (to be produced typically on a printer or a display screen) in a manner independent of the application software, hardware, and operating system used to create it. The PDL file can include any combination of text, graphics and images in a raster format, a resolution-independent format, or both, and may also contain other kinds of information, such as hypertext links, watermarks, bookmarks, thumbnails, and annotations.

A user program can be distributed with each document and loaded onto a computer by the user, if necessary (e.g., if the computer does not already have a loaded user program, or the computer has an older version of the user program). Alternatively, the user program can be downloaded from a document provider's web site as a browser plug-in. The user program provides a graphical user interface through which the user transacts with the document provider's server and opens a document, as described below.

The user receives a document rights management file ("usage rights") associated with the electronic document through some form of transaction with the document provider (step 104). For example, the user might obtain the usage rights as part of the received electronic document. Alternatively, the user might obtain the usage rights with the electronic document (e.g., wrapped in a single file distributed on CD-ROM), or, alternatively, might have obtained the usage rights as a separate file (e.g., an Adobe® FDF (forms data format) file distributed through e-mail as a result of a purchase of the electronic document). Typically, the usage rights includes information that specifies a set of permissions a user has for the document to restrict a user's use of the document. The set of permissions can be specified by one or more providers in a chain of providers—e.g., publisher, distributor, and Web retailer. The permissions specify the types of actions, such as text selection, text extraction, printing, and annotation, that are permitted on the document by the usage rights.

When the user opens the document, the user program makes the document available to the user according to the set of permissions specified in the usage rights (step 106). In one implementation, the user program launches a dialog box on the graphical user interface. The dialog box includes buttons or a pull-down menu of options, each associated with a type of action that is permitted on any electronic document. The user program can gray-out (or otherwise make un-selectable) the buttons or options associated with the types of actions that are not permitted on the document according to the set of permissions. In this manner, the user can click on a button or option to execute a particular permissible type of action.

If the user clicks on the button or option to print the electronic document (step 108), the user program determines from the permissions the print quality—i.e., low-fidelity or high-fidelity—that is allowed for the document (step 110). In the case where the permissions allow a high-fidelity printing operation to be performed, the user program sends the document through a regular print stream. Specifically, the user program sends the electronic document directly to an output device (step 112), where the electronic document is rendered at the resolution and color fidelity requested by the user to the extent that can provided by the output device. This creates one or more bitmaps in a memory of the output device. The bitmaps can then be produced in a print file or on a physical output (collectively, "high-fidelity print output" 116) (step 114). Notice that diversion of this rendered bitmap, such as diversion of a print file, is undesirable because it may compromise the protection of the document.

In the case where the permissions allow only a low-fidelity printing operation to be performed, the user program diverts the print stream and renders the electronic document to memory (step 118). The electronic document is rendered at a pre-determined resolution and color fidelity—i.e., at default values or at values specified in the usage rights—to create one or more bitmaps. Typically, the pre-determined resolution is 100 dots per inch (dpi) and the pre-determined color fidelity is 2-bit gray scale; however, these values can be arbitrarily set by the document provider. The bitmaps can then be produced in a print file or on a physical output (collectively, "low-fidelity print output" 122) (step 120). Generally, it would be advantageous for the values of the resolution and color fidelity to be less than the minimum required by an optical character recognition (OCR) system. This ensures that the low-fidelity print output 122 cannot easily be recreated by the OCR system into a high-fidelity, text searchable electronic document. Diversion of the print stream results in a print output 122 that does not contain embedded font definitions and does not reproduce well using paper copiers. Thus, diversion of this print stream would not compromise the protection of the original electronic document. If the electronic document includes any watermark information, the document watermarking is produced in the print output 122 as integral bits—i.e., not just appended text—which makes deliberate removal of the watermark difficult. In both cases, the high-fidelity print output 116 and the low-fidelity print output 122 may be produced on a piece of paper, on film, or on a display screen.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, optical disks, and solid state memory, such as flash memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). The term "computer" applies to programmable or programmed system, such as is found in a workstation, desktop computer, notebook computer, handheld computer, personal digital assistant (PDA), or mobile phone.

The invention has been described in terms of particular embodiments. Other embodiments are within the scope of the following claims. For example, the steps of the invention can be performed in a different order and still achieve desirable results.

What is claimed is:

1. A method for printing an electronic document, comprising:
   receiving an electronic document and usage rights, the usage rights permitting uses of the document;
   receiving a user request to print the document, and in response:
     if the usage rights allow the user to perform a high-fidelity printing operation, sending the electronic document through a regular print stream for printing, and
     otherwise if the usage rights allow the user to perform only a low-fidelity printing operation, diverting the print stream and rendering the electronic document to memory to create a low-fidelity bitmap for each page of the document in accordance with the usage rights, and printing the low-fidelity bitmaps to an output device, whereby the print output is a low fidelity rendering of the document.

2. The method of claim 1, wherein, if the usage rights allow the user to perform only a low-fidelity printing operation, the document is rendered at a pre-determined resolution specified in the usage rights.

3. The method of claim 2, wherein, if the usage rights allow the user to perform only a low-fidelity printing operation, the pre-determined resolution is lower than a minimum required by an optical character recognition (OCR) system.

4. The method of claim 1, wherein, if the usage rights allow the user to perform only a low-fidelity printing operation, the document is rendered at a pre-determined color fidelity specified in the usage rights.

5. The method of claim 4, wherein, if the usage rights allow the user to perform only a low-fidelity printing operation, the pre-determined color fidelity is a 2-bit grayscale.

6. The method of claim 1, wherein the print output is produced on a piece of paper, on film, or on a display screen.

7. A computer program product stored on a machine-readable medium for printing an electronic document, the product comprising instructions operable to cause a programmable processor to:

receive an electronic document and usage rights, the usage rights permitting uses of the document;

receive a user request to print the document, and in response:

determine whether the usage rights allow the user to perform a high-fidelity printing operation, and if so, send the electronic document through a regular print stream for printing; and otherwise determine whether the usage rights allow the user to perform only a low-fidelity printing operation, and if so, divert the print stream and render the electronic document to memory to create a low-fidelity bitmap for each page of the document in accordance with the usage rights, and print the low-fidelity bitmaps to an output device, whereby the print output is a low fidelity rendering of the document.

8. The product of claim 7, wherein, if the usage rights allow the user to perform only a low-fidelity printing operation, the document is rendered at a pre-determined resolution specified in the usage rights.

9. The product of claim 8, wherein, if the usage rights allow the user to perform only a low-fidelity printing operation, the pre-determined resolution is lower than a minimum required by an optical character recognition (OCR) system.

10. The product of claim 7, wherein, if the usage rights allow the user to perform only a low-fidelity printing operation, the document is rendered at a pre-determined color fidelity specified in the usage rights.

11. The product of claim 10, wherein, if the usage rights allow the user to perform only a low-fidelity printing operation, the pre-determined color fidelity is a 2-bit grayscale.

12. The product of claim 7, wherein the print output is produced on a piece of paper, on film, or on a display screen.

* * * * *